June 7, 1949.　　　A. J. McMASTER　　　2,472,381
TWO-RANGE EXPOSURE METER
Filed May 12, 1945　　　　　　　　　　　　3 Sheets-Sheet 2
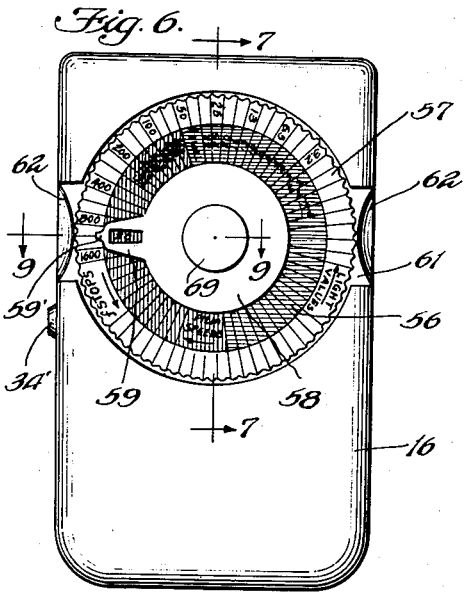
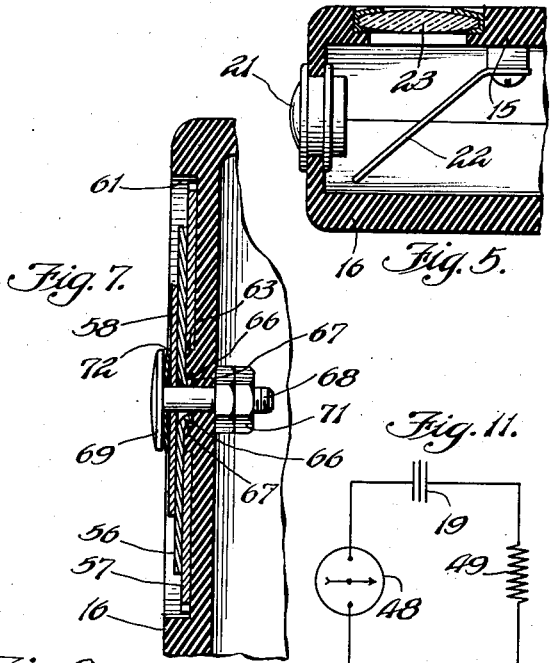
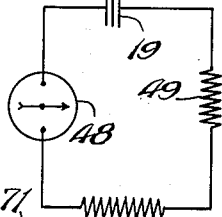
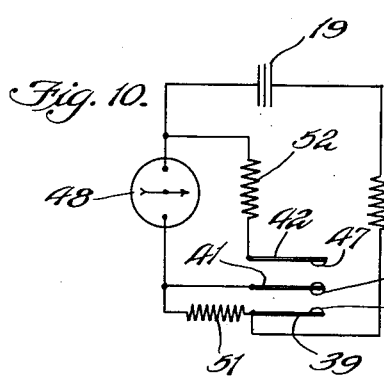
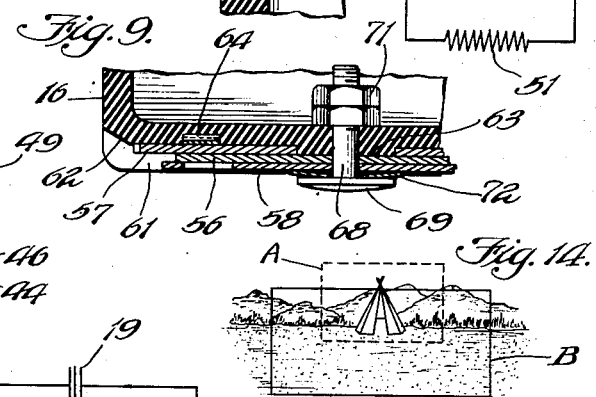
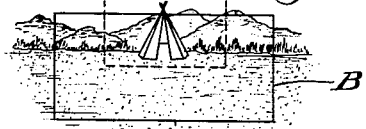
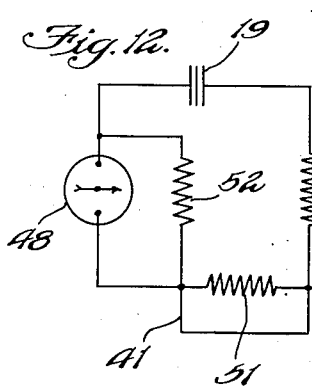
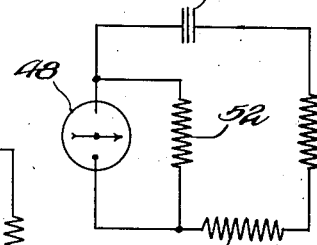
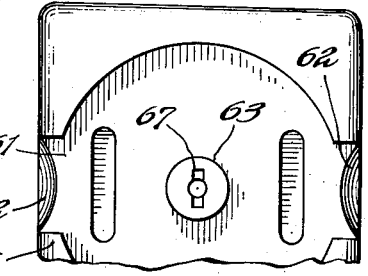
INVENTOR.
Archie J. McMaster
BY McLaughlin & Wallenstein
ATTORNEY.

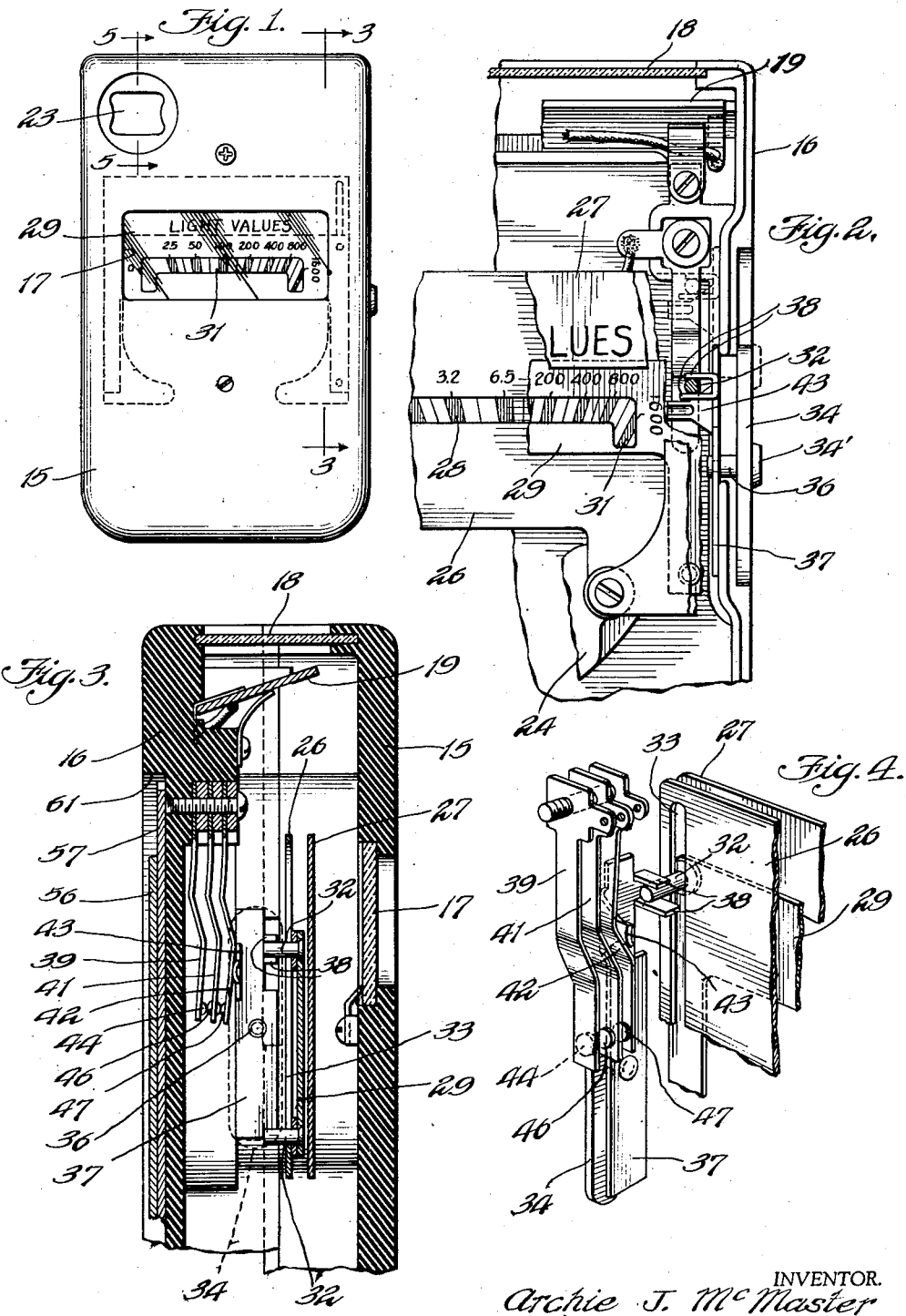

June 7, 1949.   A. J. McMASTER   2,472,381
TWO-RANGE EXPOSURE METER
Filed May 12, 1945   3 Sheets-Sheet 3
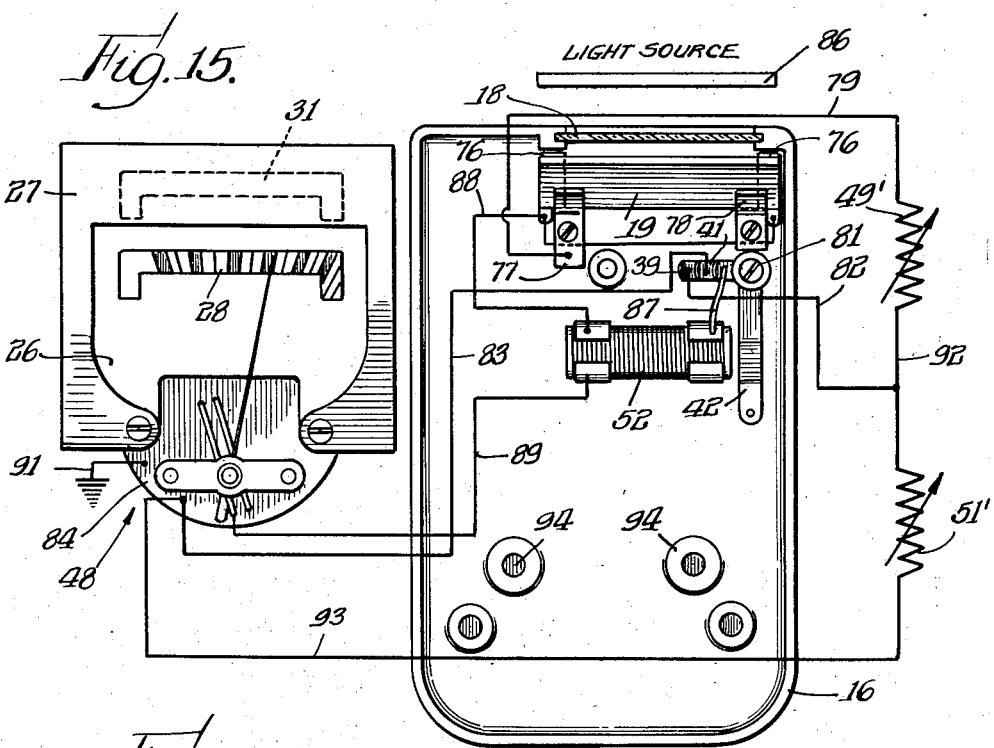
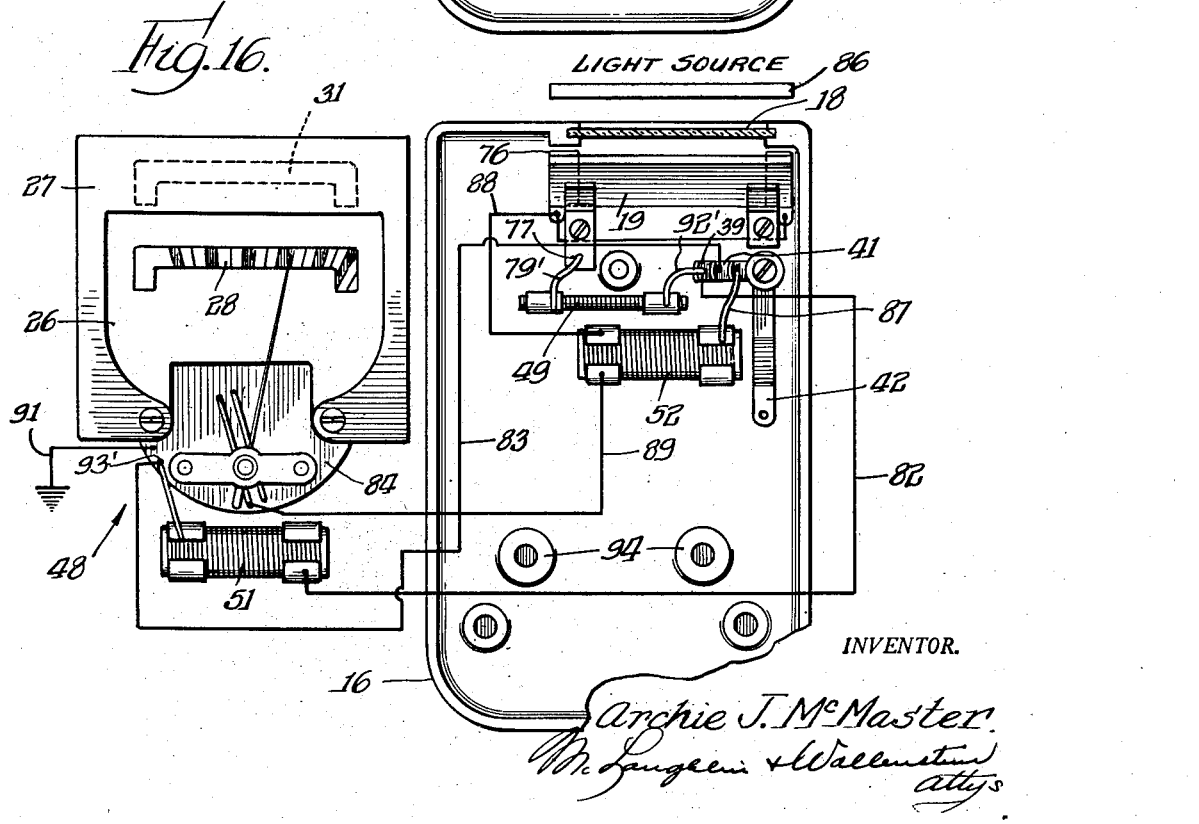
INVENTOR.
Archie J. McMaster Patented June 7, 1949

2,472,381

UNITED STATES PATENT OFFICE 2,472,381

TWO RANGE EXPOSURE METER

Archie J. McMaster, Chicago, Ill., assignor to G-M Laboratories, Inc., Chicago, Ill., a corporation of Illinois Application May 12, 1945, Serial No. 593,343

8 Claims. (Cl. 88—23)

My invention relates to exposure meters, and is a continuation-in-part of my prior application, Serial No. 392,406, filed May 8, 1941 and forfeited.

The invention has for its object the provision of an improved exposure meter with certain features and advantages which will be brought out in the description.

One embodiment of the invention is illustrated in the accompanying drawings wherein—

Fig. 1 is a plan view showing a scale of light values and the viewing lens of a view finder forming a part of the instrument;

Fig. 2 is a fragmentary view of the upper right hand portion of the instrument with the top cover removed, some of the parts being broken away in order to illustrate details of the construction;

Fig. 3 is a fragmentary transverse sectional view taken substantially along the line 3—3 of Fig. 1 looking in the direction of the arrows;

Fig. 4 is a perspective view of certain details including a sliding scale, a support therefor, and some of the related parts, the view being taken from the left hand side looking at Fig. 3;

Fig. 5 is a fragmentary sectional view taken on the line 5—5 of Fig. 3 and showing the construction of the view finder;

Fig. 6 is a plan view of the exposure meter of my invention showing the side thereof opposite to that shown in Fig. 1 and illustrating the stop and shutter speed calculator or computer;

Fig. 7 is a vertical sectional view taken on the line 7—7 of Fig. 6;

Fig. 8 is a fragmentary plan view of the housing with the principal calculator parts removed;

Fig. 9 is a fragmentary transverse sectional view taken through the calculator;

Fig. 10 is a circuit diagram showing the circuit including a cell and galvanometer and illustrating the means for adjusting the sensitivity of the circuit to the particular scale used;

Fig. 11 shows the circuit arrangement when the scale showing low levels of illumination is employed;

Fig. 12 shows the circuit arrangement when the scale showing high levels of illumination is employed;

Fig. 13 shows the circuit arrangement at the intermediate position when shifting from one scale to the other;

Fig. 14 is a diagrammatic view showing the general relationship between the area covered by the picture to be photographed and that from which light is reflected to the cell of the exposure meter and through the view finder;

Fig. 15 is a plan view, partly schematic, showing the general arrangement and organization of parts at that time during the assembly when the circuits are calibrated; and Fig. 16 is a similar view showing the assembly after calibration and set up for a test check of the circuit with permanent shunt and series resistances in place.

The exposure meter of my invention employs a photo-voltaic cell, such as one of the barrier layer type, and a galvanometer, the deflecting needle of which is adapted to indicate on a suitable scale the average intensity of the light striking the cell. The cell is supported in such a way in the case or housing containing the galvanometer, scale and essential parts of the instrument that the light reaching the cell is reflected from a much larger area than the area which will be included in a photograph if taken from the same vantage point and the camera directed in the same direction as the exposure meter. Using a common expression, the light acceptance angle of the exposure meter of my invention is much wider than the light acceptance angle of the usual camera (commonly about 60°), while the light acceptance angle of the view finder is approximately the same as that of the cell. The exposure meter is provided with two light scales, one for use when the level of illumination is low and the other for use when the level of illumination is high. The sensitivity of the circuit including the galvanometer and cell is increased when the scale showing low levels of illumination is employed and decreased when the scale showing high levels of illumination is employed but the light acceptance angle of the exposure meter, cell and view finder remain unchanged. Preferably, I provide the two scales on separate panels, one scale carrying panel being slidable over the face of the other, and adjust the sensitivity of the circuit concomitantly with the adjustment of the position of the movable scale carrying panel. A circuit is employed which permits accurate calibration of the galvanometer over both scales. I also provide an improved arrangement for the computer or calculator mounted on one face of the instrument for computing the exposure time from the light readings on the scale of light values.

Looking now to some of the details of construction, the exposure meter of my invention utilizes a two-part housing comprising a front housing member 15 and a rear housing member 16. The front housing member has a window 17 through which scales of light values, to be described, may be read. An end window 18 allows the light to strike a light sensitive cell 19 supported in a suitable manner, as shown, on one of the housing members. Adjacent the window 18 and light sensitive cell 19 is a view finder comprising a lens 21, mirror 22 and viewing lens 23.

Mounted on a permanent magnet 24 of a D'Arsonval type of galvanometer are two panels 26 and 27, the former carrying a scale 28 of low light values and the latter functioning as a screen to cover a panel 29 carrying a scale 31 of high light values and supported in slidable relation with respect to the other two panels. The panel 29, as shown clearly in Figs. 3 and 4, carries a pair of pins 32, extending through a slot 33 in the panel 26.

In order to provide means for shifting the panel 29 carrying the scale 31 from the outside of the housing, I provide a scale shifter bar 34. This scale shifter bar has a button portion 34' for engagement by the fingers and a pin 36, the end of which is riveted to a panel shifting and switch operating member 37, shown particularly in Figs. 2 and 4. The pin 36 projects through a slot provided between the housing members, which slot is covered by the scale shifter bar 34, and the scale shifter bar 34 and member 37 are held in position bearing against opposite sides of the housing members. In order to move the panel 29, the member 37 is provided with a pair of projections 38 engaging on opposite sides of one of the pins 32 so that longitudinal movement of the member 37 will either shift the panel 29 underneath the panel 27 or expose it to view in the position indicated in Fig. 2. In order to control the circuit including the galvanometer and light cell, I provide three spring switch arms 39, 41 and 42, and a switch operating projection 43 on the member 37. The switch arms carry contacts 44, 46 and 47, the contact 46 being the center contact and being a double contact adapted to engage either the contact point 44 or the contact point 47. Normally, all of the contacts are open and this is the position of the meter when the scale 28 is visible through the window 17. The switch arms have an offset portion, as shown, and, if the panel 29 carrying the scale 31 is shifted to visible position, the switch operating projection 43 operates to first engage the contact points 47 and 46 and finally the contact points 46 and 44. In the final shifted position, the three contacts are in mutual engagement. The scale shifting mechanism preferably is constructed in such a way that the proper circuits are closed before the numbers of the corresponding scale are exposed to view, thus making it impossible to misread the scale.

In Figs. 10 to 13, inclusive, I illustrate the circuits involved. In Fig. 10, the cell 19 is illustrated schematically, as well as a galvanometer 48. The circuit includes series resistances 49 and 51 and a shunt resistance 52. The contact points 44, 46 and 47 correspond to those shown in Figs. 3 and 4. As already noted, when the scale 28 is visible through the window 17, the contact points 44, 46 and 47 are open and the circuit is in the condition illustrated in Fig. 10. For convenience in representing the circuit, the actual circuit established when the parts are in the position in Fig. 10 is shown in Fig. 11. It will be seen that the series resistances 49 and 51 are a part of the circuit but the shunt resistance has been cut out. When the contacts are all closed as in the position when the scale 31 on the panel 29 is entirely visible through the window 17, then the circuit shown in Fig. 12 is established. In this circuit, the series resistance 49 is a part of the main galvanometer cell circuit, but resistance 51 has been cut out through the switch arm 41 which now bridges it. The shunt resistance 52, however, has been cut in and forms a part of the circuit. It should be understood that it is the usual moving coil of the galvanometer which is included in the circuit when a permanent magnet type of galvanometer is used, and the shunt resistance will, therefore, be connected so as to shunt the moving coil. Fig. 12, therefore, is the circuit for low sensitivity, that is to say, the circuit that is established when the scale of high light values is being used. The significance of the shunt resistance and other features of the circuit will be made clear as the description progresses. It will be noted that the difference between the high sensitivity position and the low sensitivity position is that in the former there is no shunt resistance while in the latter the shunt resistance has been added but the value of the total resistance in series with the cell and coil has been decreased. In the intermediate position, shown in Fig. 13, the circuit has its lowest sensitivity including, as it does, both resistances 49 and 51 (the maximum series resistance which the circuit provides for) as well as the shunt resistance 52. This is the position established when the panel 29 is only partially shifted and there is a transition which occurs when the contact point 47 is in engagement with the contact point 46 but the contact point 44 has not yet been engaged. If the user of the meter should inadvertently shift the panel 29 only part way, then he will usually obtain no reading whatsoever and there is little likelihood of his reading from the low sensitivity (high light value) scale when the galvanometer needle is responding to current values which should be read from the high sensitivity (low light value) scale. The possibility of obtaining an incorrect reading is also obviated in the construction shown because, in the partly shifted position, the numbers on both scales are covered.

The characteristics of the circuit employed will be made clear by an explanation of the manner in which the meter is calibrated. A suitable calibration procedure is first to connect the cell and meter in a circuit with the resistance 51 but without the shunt resistance 52 and without the series resistance 49. Resistance 51 is then adjusted to give approximately the proper deflection on the fifty candles per square foot division of the scale with the cell facing a brightness source of fifty candles per square foot. When the proper resistance 51 has been determined to produce the proper deflection, the meter is calibrated to low light values, preferably by demagnetizing the meter magnet slightly until a proper reading is obtained at low levels of brightness, for example, 1.6 candles per square foot, still using, of course, the scale 28, that is to say, the scale of low light values.

The next step is to select the proper value for the shunt resistance 52. Since the shunt resistance is not a part of the high sensitivity circuit, that is to say, the circuit which is established when the scale 28 is used, the value of the shunt resistance is established in connection with the scale of high light values. The value of this shunt resistance should be established at a relatively low value on the scale 31, for example, a value of fifty candles per square foot. When this value has been established, the resistance 49 is then inserted in the circuit and its value established, still employing the scale of relatively high light values 31. I preferably select the resistance 49 to give a proper reading at a light value of 1000 candles per square foot. The next step is to shift the switch back to establish the circuit shown in Fig. 11 and bring to view the scale 28. The value of resistance 51 is again determined using a source of illumination which should give substantially the maximum reading for the sensitive position, for example, 50 candles per square foot. The meter is then rechecked for various light values over both scales, using, for example, the 0.4, 3.2, 13 and 50 candles per square foot divisions on the scale 28 and the 50, 130, 400 and 1000 candles per square foot divisions on the low sensitivity scale. I have found that, by following this sequence of operations, the adjustments are practically independent of each other, it being noted, however, that initially the resistance 51 is adjusted approximately and as a last step adjusted precisely.

That those skilled in the art may understand the circuit arrangement employed and the manner of its calibration, I wish to point out that the usual barrier layer cell has a relatively high internal resistance for low levels of illumination and a relatively low internal resistance for high values of illumination. One of the principal reasons for employing an external resistance is to obtain a more nearly logarithmic scale. Thus when calibrating at a high light level the external resistance has a large effect, but when calibrating at low light levels the external resistance has a much smaller effect. This makes it possible to calibrate at a low level by changing the magnet strength and finally to calibrate at a high level by changing external resistance without appreciably affecting the low level calibration. This is in part compensated for by the resistance of the meter itself. To illustrate the resistance values, I have found that in a meter movement having a resistance of 1800 ohms, a shunt resistance having a value of about 100 ohms may be used with resistance 51 having a value of approximately 500 to approximately 4000 ohms and resistance 49 having a value of less than 600 ohms and at times approaching zero. By my method of calibration, I establish, in effect, the approximate resistance for the low end of the same scale by suitable means, preferably demagnetizing the permanent magnet, establish the resistance values for the low sensitivity scale and, finally, adjust precisely the resistance for the high end of the high sensitivity scale. By this means, I am able to obtain a high degree of accuracy over both scales without depending primarily upon mechanical precision to get proper scale tracking, thus securing a very great advantage not only in accuracy of the completed meter but also in that it is not necessary to employ a number of printed scales as is frequently done and select one of them to match a combination of cell and meter characteristics. I wish to point out also that, while the resistance 52 may be plus or minus 100 ohms, it is possible to use a standard resistance value such as 100 ohms and still obtain substantially as great accuracy as if the value of the resistance 52 was separately selected for each instrument.

The calculator shown in Figs. 6 to 9, inclusive, includes a stationary disk 56, a rotatable disk 57 and a rotatable disk 58 carrying an indicating projection 59. These disks are set in a recess 61 formed in the case, the sides of which are shaped at 62 to facilitate grasping the edges of the disk 57 with the fingers. A circular boss 63 formed centrally of the recess 61 on the case, journals the disk 57 so as to permit its rotation. Friction springs 64 set in the face of the recess 61 bear against the underside of the disk 57 so as to hold this disk lightly in any position to which it may be turned. The stationary disk 56 has two ears 66 bent out of the main plane of the disk to engage in a slot-like recess 67 formed on the face of boss 63. These ears 66 lie at opposite sides of a hole shaped to receive a small bolt 68 having a relatively large head 69 and held in position by nuts 71 on the inside of the housing. The disk 58 also has an opening through which the small bolt 68 passes and a spring washer 72 disposed between the head 69 and the face of disk 58 imparts enough friction to the disk to prevent its rotating too freely. Thus, it will be seen that, while the disks 57 and 58 are both rotatable, each is separately braked by friction means to prevent accidental rotating movement.

The disk 59 carries around approximately half its periphery divisions showing light values and around slightly less than half of its periphery divisions showing $f$ stops. The stationary disk 56 has somewhat more than half of its periphery covered with divisions showing exposure times and somewhat less than half of its periphery with divisions showing film speed values. It will be noted that the projection 59 has a window or opening, and the film speed rating of the film being utilized in the camera is visible through this window. The scale 57 is adjusted so that the projection tip 59' points to the light value shown by the position of the pointer on either the scale 28 or the scale 31.

To employ the calculator, the disk 58 is first adjusted so that the speed value of the film loaded in the camera is shown through the opening in the projection 59. A light reading is taken and the disk 57 turned until the light value is in line with the point 59'. The scales of $f$ stops and of exposure times will now be adjacent each other and any combination of exposure time and $f$ stop falling along substantially the same radial line may be employed in taking the picture. The advantage of the arrangement shown is that it is not necessary for the user of the meter continuously to remember what his film speed is in order to set the light value to it. He can at all times see the film speed through the opening in the projection 59 and, because of the friction on the disk 58 and the fact that it does not have to be turned except to set a new film speed value, the initial adjustment will be unchanged, and the user is required only to operate the outer disk 57.

In using the meter of my invention, the view finder is employed in several possible ways. One method is for the operator to walk toward the object to be photographed until the principal object entirely occupies the area seen in the view finder. If a reading is taken with the meter in this position, it will give the true brightness value of the principal subject of interest. If it is not convenient to move to a position in which the subject of interest occupies substantially the area covered by the view finder, the operator then should measure the brightness of an area or scene which is truly comparable in brightness to that of the center of interest. Looking at Fig. 14, it may be assumed that the picture to be taken will embrace the area identified by the relatively small rectangle A. The principal subject or center of interest is in the foreground not in the sky which embraces roughly one-third of the area to be covered by the picture. If the exposure meter should be pointed directly toward the area to be photographed, as would occur if the light acceptance angle of the exposure meter were the same as the camera, and the exposure meter and camera were directed to identical points, an error would obviously occur because the much greater brightness of the sky would cause the average brightness of the scene to appear much greater than the average brightness of the scene in which detail is desired. The result would be an underexposure of the film. By employing the view finder of my invention in accordance with its intended function, the exposure meter may be directed to receive light from the area of the large rectangle B. This is approximately the area that will be seen in the view finder. By directing the exposure meter to receive light from more of the foreground and less of the sky, the true average brightness of the center of interest will be determined. Obviously it cannot be assumed that if an exposure meter has essentially the same light acceptance angle as the camera that the correct exposure will be obtained by measuring the average brightness of the scene to be photographed. It is essential that the exposure meter record the average brightness of the center of interest and this is accomplished either by measuring the brightness of the center of interest only or by measuring the brightness of an area or scene which is truly comparable in brightness with that of the center of interest. This is accomplished by means of the view finder which, as pointed out, shows substantially the same area from which light is reflected to the sensitive cell, the light acceptance angle of both being substantially greater than 60°.

The features and advantages of the construction and circuit employed may be partly understood by reference to actual calibration of the instrument in connection with assembly as illustrated in Figs. 15 and 16. As shown particularly in Fig. 15 (this may be seen also in part in Fig. 2), a pair of front contacts 76 formed of metal suitably applied to engage the front or selenium layer of the cell 19, and these contacts are interconnected as shown. The cell is held in position by a pair of spring clips 77 and 78, the former being utilized as a contact member and having connected thereto a conductor 79. The switch arms 42, 41 and 39, respectively, running from top to bottom, are mounted on the rear housing member 16 by a screw 81 and these members have insulating spacers separating them, as shown in Fig. 3, so that they are normally out of contact with each other except when the scale of high light values on the panel 29 is exposed to view. Each of these arms has a side projection comprising a contact portion and, for convenience, these have been bent upwardly in a differential manner to expose all three of them to view. As illustrated in Fig. 15, the lower arm 39 has connected thereto a conductor 82 and the intermediate arm has connected thereto a conductor 83.

In the calibration arrangement shown in Fig. 15, a particular barrier layer cell 19 has been associated with a particular galvanometer indicated generally by the reference character 48 (note Figs. 10–13). For convenience, I have indicated the permanent magnet and support frame portions of the meter by the reference character 84. The lower housing 16, with the cell in position, is placed on a fixture in fixed relation to a light source 86. In a simple preferred calibration and assembly method, shunt resistance 52 is permanently mounted by means of a relatively heavy support wire 87 to the top switch arm 42, thus connecting one end of the shunt resistance 52 to such switch arm. A conductor 88 runs from the front contact 76 to the opposite end of the shunt resistance 52 and conductor 89 runs from the same terminal of the shunt resistance 52 to the top spring connnection of the D'Arsonval galvanometer 48. Suitably the bottom spring of the galvanometer 48 is connected to ground as indicated by the ground wire 91, ground, in this instance, comprising the frame portions, (permanent magnet structure, etc.) 84 of the galvanometer. A connection to the supporting frame portion 84, therefore, comprises a connection to the lower supporting spring of the galvanometer coil. To preliminarily determine the value of the series resistances, I employ variable calibrated resistances 49' and 51', corresponding to the series resistances 49 and 51, respectively, in the completed instrument. These are connected into the circuit by a conductor 92 connected to one side of each of the variable resistances, and a conductor 93 running from one side of resistance 51' to the bottom spring of the galvanometer. Conductor 79 connected to the back terminal 77 is connected to one terminal of variable resistance 49'. Conductor 83 previously noted as connected to the center contact arm 41 has its opposite end connected to the lower supporting spring of the galvanometer 48.

It will be seen that the above connections to the several parts, including the variable resistances 49' and 51', establish a circuit which is electrically identical with the circuit shown in Fig. 10. This circuit may be established either with the galvanometer suitably supported adjacent the bottom housing 16 or it may be mounted in position on the integral projections 94, depending upon how much space is available for subsequently permanently mounting the resistances and making the necessary connections. In any event, it is essential that once a galvanometer and cell have been associated with each other that they remain together, unless, of course, such lack of performance is found with one or the other that a defective part is shown to exist. If this should be found the case, assembly and calibration must begin anew.

In the calibration procedure, the same general method is employed with respect to both the high sensitivity (low light value) circuit and the low sensitivity (high light value) circuit, namely, first to establish approximately the value of the external series resistance which will give correct deflection at an upper value on the scale, then to calibrate for a low value on the same scale and finally to establish accurately the value of the series resistance to give a correct reading at a high value on such scale. In actual practice, I find that I can first permanently mount the shunt resistance 52 in the manner shown in Fig. 15, selecting a value of 100 ohms when the meter has a resistance of approximately 1800 ohms and the arrangement shown is employed. With the arms 42, 41 and 39 (reading from top to bottom) in their normal non-depressed condition and with the scale 28 (on panel 26) exposed to view the light source 86 is adjusted to direct a light of the value of 50 candles per square foot against the selenium layer of cell 19. A convenient arrangement of scale values is to provide on the high sensitivity (low light value) scale for an upper value of 50 candles per square foot with a lower value of zero and a logarithmic progression of values between the two extremes. The low sensitivity (high light value) scale may also be logarithmic in character and extend from approximately 25 candles per square foot to approximately 1600 candles per square foot. With the scale 28 exposed to view and the light source controlled to 50 candles per square foot, the resistance 51' is adjusted to give the proper 50 candles per square foot deflection on the scale 28, the resistance 49' being maintained at zero during such adjustment of the resistance 51'. Next the light source is adjusted to a low level of brightness, for example, 1.6 candles per square foot, and the meter calibrated by ageing the magnet, for example, to cause the needle to show deflection of the said values selected, namely, 1.6 candles per square foot. The light source is again adjusted to a value of 50 candles per square foot and the resistance 51 again adjusted to give an accurate reading on the high sensitivity scale of 50 candles per square foot.

To now calibrate for the low sensitivity scale, the arm 42 is depressed, using a suitable fixture for the purpose and this will result in establishing a circuit corresponding to that shown in Fig. 12 (resistance 51 will be shunted out) because through conductors 92 and 82, switch arm 39, switch arm 42 and conductor 83, the resistance 49' is connected directly to the lower spring of the galvanometer. Having previously determined the value of shunt resistance 52, light source 86 is now adjusted to an upper value on the low sensitivity scale, for example, 1000 candles per square foot, and with the low sensitivity scale exposed to view, variable resistance 49', previously set at zero value, is adjusted to cause a correct reading at the selected high light value. Still utilizing the low sensitivity scale, the light source is adjusted to 50 candles per square foot and a reading taken on the scale. I have found that by proper construction of scales, a standard shunt resistance 52 of 100 ohms will almost always result in proper deflection at a low value on the low sensitivity scale if the meter has previously been calibrated in the manner described. In those instances in which this condition is not found to exist, the correct value for the shunt resistance may be determined and the proper value inserted. I have found, however, that so seldom is this necessary following the teachings of the present invention, that for practical assembly work a shunt resistance of predetermined value (e. g. 100 ohms) may be mounted in position before calibration is made. If a change in the value in the shunt resistance is necessary, then it is necessary again to calibrate at a high level of brightness by a further adjustment of the resistance 49'. When the low sensitivity scale has been calibrated, then the resistance value of variable resistance 51', originally established, is decreased by the amount of resistance introduced into the variable resistance 49'. This is necessary because at low levels of brightness, the circuit of Fig. 11 is established and both of these resistances are connected into such circuit.

The value of resistances 49' and 51' having been established and the shunt resistance 52 having been permanently mounted in position, the resistances 49 and 51 are permanently mounted in the manner shown in Fig. 16. It will be noted that in place of conductor 79, a relatively heavy conducting and support wire 79' is employed to mount the resistance element 49 on the spring clip 77 and a similar support wire 93' mounts resistance element 51 to the frame portion 84 of the meter. The conductor 82 now directly connects the opposite end of resistance element 51 to the lower contact arm 39 while conductor 92' connects resistance element 49 also to the lower contact arm 39. Conductors 83, 87, 88 and 89 remain as they were connected in Fig. 15. Such mounting of the resistance elements establishes the final circuit. The light source 86 is now adjusted through the range of the two scales in the manner discussed in a previous part of the specification. This assures a final check of the calibrated meter and the fact that resistances of the proper value have been connected into the circuit. The meter is then mounted in position if it has not already been in position and the instrument is finally assembled by placing the case 15 in position, assembling the shifting mechanism in the manner shown, particularly in Figs. 2 and 4, and completing the assembly by applying screws holding the two casing halves together.

Thus, it will be seen that I have invented an exposure meter by means of which the proper adjustment of exposure time and stop of a camera may be quickly and accurately determined. The operator may shift from low to high sensitivity settings, or the reverse, almost instantly, without changing the position of the instrument, without changing the light acceptance angle of the cell and with no possibility of reading the wrong scale. Should the panel not be entirely shifted, the circuit of minimum sensitivity is established, and, moreover, the scales will be out of position and difficult, if not impossible, to read. This substantially compels the operator to shift the panel fully, and he will not take a reading which is inaccurate. The view finder facilitates determining the actual brightness of the center of interest or a truly comparable area, regardless of which scale of light values is being employed. The viewing lens of the view finder is in position so that the scale of light value is readily seen at the same time. When the light value has been accurately determined, the proper camera setting can be determined readily from the calculator with little possibility of securing the wrong results because of errors of omission or commission. These features are all obtainable in an instrument employing improved circuit and calibrating features, and which, therefore, can be fabricated to have high accuracy at relatively low cost.

What I claim as new and desire to protect by Letters Patent of the United States is:

1. In an exposure meter, a housing, a photovoltaic cell adapted to receive light through a window in said housing, a galvanometer including a moving coil carrying an indicating needle, means providing a scale of relatively low light values, and a scale of relatively high light values, either of which is adapted to be seen through a window in the housing, a relatively sensitive circuit including in series a resistance, said cell and galvanometer coil, said circuit adapted to be established when the scale of low light values is employed, a relatively less sensitive circuit including in series a resistance, said cell and galvanometer coil, and a resistance in shunt relation to said coil, said circuit adapted to be established when the scale of high light values is employed, and means exterior of the housing to establish either of said circuits, said last-mentioned means including a slidable finger engageable member at the extremes of movement of which said circuits are established, and means to establish at intermediate positions of said member a cell and galvanometer circuit less sensitive than either previously mentioned circuit.

2. In an exposure meter, a housing, a photovoltaic cell adapted to receive light through a window in said housing, a galvanometer including a moving coil carrying an indicating needle, a panel having a scale of relatively low light values, a panel having a scale of relatively high light values, said panels being in overlapping sliding relation and one of said panels being slidable to present its scale to view through a window in the housing, or away from said window to expose the remaining panel to view therethrough, a relatively sensitive circuit including said cell and galvanometer coil, a relatively less sensitive circuit including said cell and galvanometer coil, and means exterior of the housing to move said panel, and concomitantly to shift from one of said circuits to the other, said circuits being established at extremes of movement of said panel, and means for establishing at intermediate positions a condition wherein the galvanometer has its minimum deflection at a given light value and the possibility of taking an incorrect reading from either scale is minimized.

3. In an exposure meter, a housing, a photovoltaic cell positioned to receive light through a window in said housing, a galvanometer including a moving coil carrying an indicating needle, a fixed panel having a scale of relatively low light values visible through a window in the housing and positioned to have said needle track thereover, a panel having a scale of relatively high light values slidable to a position away from said window, or to a position to be seen through the window and cover said first-mentioned panel, a circuit including said cell, said galvanometer coil, a plurality of contacts, a shunt resistance and a plurality of series resistance elements, said circuit being so arranged that the cell, coil and series resistance elements are in series relation when said contacts are open, and, when said contacts are closed, the cell and coil are in series relation with less total resistance than when the contacts are open and said shunt resistance is bridged across said coil, spring contact members carrying said contacts, a finger engaging member supported in slidable relation exteriorly of the housing, a connection between said finger engaging member and slidable panel whereby the panel may be shifted thereby, and a contact engaging member movable with said panel whereby to open said contacts when said panel is moved to a position away from said window, and to close said contacts when said panel is moved to position to be seen through said window.

4. In an exposure meter, a housing, a photovoltaic cell positioned to receive light through a window in said housing, a galvanometer including a moving coil carrying an indicating needle, a fixed panel having a scale of relatively low light values visible through a window in the housing, and positioned to have said needle track thereon, a panel having a scale of relatively high light values slidable to a position away from said window, or to a position to be seen through the window and cover said first-mentioned panel, a circuit including said cell, said galvanometer coil, a plurality of contacts, a shunt resistance and a plurality of series resistance elements, said circuit being so arranged that the cell, coil and series resistance elements are in series relation when said contacts are open, and, when said contacts are closed, the cell and coil are in series relation with less total resistance than when the contacts are open and said shunt resistance is bridged across said coil, spring contact members carrying said contacts, a finger engaging member supported in slidable relation exteriorly of the housing, a connection between said finger engaging member and slidable panel whereby the panel may be shifted thereby, and a contact engaging member movable with said panel whereby to open said contacts when said panel is moved to a position away from said window, and to close said contacts when said panel is moved to position to be seen through said window, said circuit, including said contacts, being so constructed and arranged that at intermediate positions of said panel the total number of series resistances and said shunt resistances are included in the circuit.

5. In an exposure meter, a housing, a photovoltaic cell positioned to receive light through a window in said housing, a galvanometer including a moving coil carrying an indicating needle, a fixed panel having a scale of relatively low light values visible through a window in the housing and positioned to have said needle track thereon, a panel having a scale of relatively high light values slidable to a position away from said window, or to a position to be seen through the window and cover said first-mentioned panel, a circuit including said cell, said galvanometer coil, a plurality of contacts, a shunt resistance and two series resistance elements, said circuit being so arranged that the cell, coil and both of said series resistance elements are in series relation when said contacts are open, and, when said contacts are closed, the cell and coil are in series relation with one of said resistance elements and said shunt resistance is bridged across said coil, spring contact members carrying said contacts, a finger engaging member supported in slidable relation exteriorly of the housing, a connection between said finger engaging member and slidable panel whereby the panel may be shifted thereby, and a contact engaging member movable with said panel whereby to open said contacts when said panel is moved to a position away from said window, and to close said contacts when said panel is moved to position to be seen through said window.

6. In an exposure meter, a housing, a photovoltaic cell positioned to receive light through a window in said housing, a galvanometer including a moving coil carrying an indicating needle, a fixed panel having a scale of relatively low light values visible through a window in the housing and positioned to have said needle track thereon, a panel having a scale of relatively high light values slidable to a position away from said window, or to a position to be seen through the window and cover said first-mentioned panel, a circuit including said cell, said galvanometer coil, a plurality of contacts, a shunt resistance and two series resistance elements, said circuit being so arranged that the cell, coil and both of said series resistance elements are in series relation when said contacts are open, and, when said contacts are closed, the cell and coil are in series relation with one of said resistance elements and said shunt resistance is bridged across said coil, spring contact members carrying said contacts, a finger engaging member supported in slidable relation exteriorly of the housing, a connection between said finger engaging member and slidable panel whereby the panel may be shifted thereby, and a contact engaging member movable with said panel whereby to open said contacts when said panel is moved to a position away from said window, and to close said contacts when said panel is moved to position to be seen through said window, said circuit including said contacts being so constructed and arranged that, at intermediate positions of said panel, said shunt resistance element and both of said series resistance elements are connected into the circuit.

7. In an exposure meter, a housing, a photovoltaic cell positioned to receive light through a window in said housing, a view finder positioned near said window having a viewing lens and an object lens of wide angle showing substantially the area from which light is reflected to said cell, a galvanometer including a moving coil carrying an indicating needle, a fixed panel having a scale of relatively low light values visible through a window in the housing, a panel having a scale of relatively high light values slidable to a position away from said window, or to a position to be seen through the window and cover said first-mentioned panel, a circuit including said cell, said galvanometer coil, said last mentioned window being positioned on a face of the housing where the viewing lens of said view finder is positioned, a plurality of contacts, a shunt resistance and a plurality of series resistance elements, said circuit being so arranged that the cell, coil and series resistance elements are in series relation when said contacts are open, and, when said contacts are closed, the cell and coil are in series relation with less total resistance than when the contacts are open and said shunt resistance is bridged across said coil, spring contact members carrying said contacts, a finger engaging member supported in slidable relation exteriorly of the housing, a connection between said finger engaging member and slidable panel whereby the panel may be shifted thereby, and a contact engaging member movable with said panel whereby to open said contacts when said panel is moved to a position away from said window and to close said contacts when said panel is moved to position to be seen through said window.

8. In an exposure meter, a housing, a photovoltaic cell positioned to receive light through a window in said housing, a galvanometer including a moving coil carrying an indicating needle, a fixed panel having a scale of relatively low light values visible through a window in the housing, a panel having a scale of relatively high light values slidable to a position away from said window, or to a position to be seen through the window and cover said first-mentioned panel, a circuit including said cell, said galvanometer coil, a plurality of contacts, a shunt resistance and two resistance elements, a finger engaging member supported in slidable relation exterior of the housing, a connection between said finger engaging member and slidable panel whereby the panel may be shifted thereby, and means including said contacts for controlling said circuit to connect said two series resistances in series with the cell and galvanometer coil when the scale of low light values is exposed to view and to cut out one such series resistance and connect the shunt resistance across the said coil when the scale of high light values is exposed to view.

ARCHIE J. McMASTER.

REFERENCES CITED

The following references are of record in the file of this patent:

UNITED STATES PATENTS

| Number | Name | Date |
|---|---|---|
| 2,048,655 | Hineline | July 21, 1936 |
| 2,145,147 | Wolferz | Jan. 24, 1939 |
| 2,199,464 | Kuppenbender et al. | May 7, 1940 |
| 2,227,166 | Tonnies | Dec. 31, 1940 |
| 2,233,914 | Collins | Mar. 4, 1941 |
| 2,241,020 | Nerwin | May 6, 1941 |
| 2,285,761 | Tonnies | June 9, 1942 |